(12) United States Patent
Breynaert et al.

(10) Patent No.: US 12,139,102 B2
(45) Date of Patent: Nov. 12, 2024

(54) APPARATUS AND METHOD FOR DETERMINING ACCESS INTENTION RECOGNITION FOR USE IN A VEHICLE WITH A HANDLELESS DOOR

(71) Applicants: Inteva Products France SAS, Sully sur Loire (FR); Marquardt GmbH, Rietheim-Weilheim (DE)

(72) Inventors: François Breynaert, Caen (FR); Laurent Cheramy, Vieilles Maisons sur Joudry (FR); Jean-Marc Belmond, Saint Jean le Blanc (FR); Pascal Philippe, Saulcy Meurthe (FR); Oliver Huppenbauer, Villingen-Schwenningen (DE); Andreas Becher, VS-Obereschach (DE)

(73) Assignees: INTEVA FRANCE, Sully-sur-Loire (FR); MARQUARDT GMBH, Rietheim-Weilheim (DE)

( * ) Notice: Subject to any disclaimer, the term of this patent is extended or adjusted under 35 U.S.C. 154(b) by 20 days.

(21) Appl. No.: 17/489,053

(22) Filed: Sep. 29, 2021

(65) Prior Publication Data

US 2022/0017043 A1 Jan. 20, 2022

Related U.S. Application Data

(63) Continuation of application No. PCT/IB2019/000424, filed on Mar. 29, 2019.

(51) Int. Cl.
*B60R 25/24* (2013.01)
*B60R 25/01* (2013.01)
(Continued)

(52) U.S. Cl.
CPC ............ *B60R 25/245* (2013.01); *B60R 25/01* (2013.01); *B60R 25/2045* (2013.01);
(Continued)

(58) Field of Classification Search
None
See application file for complete search history.

(56) References Cited

U.S. PATENT DOCUMENTS

| 1,048,022 | A | 12/1912 | Yost |
| 9,030,291 | B2 | 5/2015 | Muramatsu et al. |

(Continued)

FOREIGN PATENT DOCUMENTS

| CN | 103526992 A | 1/2014 |
| CN | 107719303 A | 2/2018 |

(Continued)

OTHER PUBLICATIONS

International Search Report for International Application No. PCT/IB2019/000424; Application Filing Date: Mar. 29, 2019; Date of Search: Nov. 15, 2019, 5 pages.

(Continued)

*Primary Examiner* — Carlos Garcia
(74) *Attorney, Agent, or Firm* — CANTOR COLBURN LLP

(57) ABSTRACT

A handleless door entry system for a vehicle. The system including: an occupant detection component including a first detection component and a second detection component, wherein the first detection component is configured to detect a device within a predetermined distance of the handleless door entry system, and wherein the second detection component is configured to detect an intent of an object or individual approaching the handleless door entry system.

14 Claims, 2 Drawing Sheets

(51) Int. Cl.
   *B60R 25/20*   (2013.01)
   *G07C 9/00*    (2020.01)
(52) U.S. Cl.
   CPC ...... *G07C 9/00309* (2013.01); *B60R 2325/10* (2013.01); *B60R 2325/205* (2013.01); *G07C 2009/00769* (2013.01); *G07C 2209/65* (2013.01)

(56) References Cited

U.S. PATENT DOCUMENTS

| | | | |
|---|---|---|---|
| 9,466,162 B2 | 10/2016 | Nakai et al. | |
| 9,499,125 B2 | 11/2016 | Akay et al. | |
| 9,721,408 B2 | 8/2017 | Obata et al. | |
| 10,600,266 B2* | 3/2020 | Ziegler | G07C 9/00309 |
| 2007/0132550 A1* | 6/2007 | Avraham | E05B 37/08 |
| | | | 70/277 |
| 2013/0200995 A1 | 8/2013 | Muramatsu et al. | |
| 2014/0232524 A1* | 8/2014 | Nakai | G07C 9/00309 |
| | | | 340/5.61 |
| 2015/0254913 A1 | 9/2015 | Obata et al. | |
| 2016/0039365 A1* | 2/2016 | Vanderwall | B60C 23/0418 |
| | | | 701/36 |
| 2017/0166166 A1 | 6/2017 | Lindic et al. | |
| 2017/0169641 A1* | 6/2017 | Ziegler | G07C 9/00309 |
| 2017/0200335 A1 | 7/2017 | Da Deppo et al. | |
| 2019/0024421 A1* | 1/2019 | Cumbo | B60R 25/241 |
| 2020/0086881 A1* | 3/2020 | Abendroth | G10L 17/00 |
| 2020/0307514 A1* | 10/2020 | Yamane | G05D 1/0212 |
| 2021/0256786 A1* | 8/2021 | Manam | G06Q 50/163 |
| 2023/0265704 A1* | 8/2023 | Zeabari | E05F 15/622 |
| | | | 74/89.38 |

FOREIGN PATENT DOCUMENTS

| | | |
|---|---|---|
| JP | 2006009333 A2 | 1/2006 |
| JP | 2014237929 A2 | 12/2014 |
| JP | 5895201 B2 | 3/2016 |
| JP | 2016142077 A2 | 8/2016 |
| JP | 2017031709 A2 | 2/2017 |
| WO | 2013018333 | 2/2013 |
| WO | 2013076760 A1 | 5/2013 |
| WO | 2014041955 A1 | 3/2014 |
| WO | 2016011125 A1 | 1/2016 |

OTHER PUBLICATIONS

Written Opinion for International Application No. PCT/IB2019/000424; Application Filing Date: Mar. 29, 2019; Date of Search: Nov. 15, 2019, 10 pages.
JPO Notice of Reasons for Rejection for corresponding JP Application No. 2021-560335; Issue Date, Dec. 15, 2023.
CNIPA Notification of Second Chinese Office Action corresponding to CN Application No. 201980095039.7; Issue Date, Apr. 25, 2024.
English translation of Notice of Reasons for Rejection dated Apr. 4, 2023; JP Application No. 2021-560335; 5 pages.
EPO Communication pursuant to Article 94(3) EPC corresponding to EP Application No. 19 739 701.1; Issue Date, Aug. 29, 2024.

* cited by examiner

APPARATUS AND METHOD FOR DETERMINING ACCESS INTENTION RECOGNITION FOR USE IN A VEHICLE WITH A HANDLELESS DOOR

CROSS REFERENCE TO RELATED APPLICATIONS

This application is a Continuation Application of PCT/IB/2019/000424, filed on Mar. 29, 2019, the entire contents of which are incorporated herein by reference thereto.

BACKGROUND

Exemplary embodiments of the present disclosure pertain to the art of vehicle door latches and in particular, vehicle door latches associated with a handleless door.

Handleless doors require an actuator referred to as a 'door presenter', which is independent or integrated into the latch that is located inside the door. This actuator will slightly rotate/open the door, enough that an end user can insert his or her fingers to grab the door flange/edge so that user can complete door opening manually.

In some applications the door presenter is configured to operate wirelessly through the use of a communication loop between the vehicle and an authorized smart-key fob, typically a Radio Frequency (RF) communication loop. Alternatively or additionally, the door presenter is configured to operate wirelessly through the use of a near-field communication (NFC) antenna or other equivalent device that detects a smart-key fob of the door entry system via the NFC antenna. Upon detection of the smart-key fob within a predetermined range the door entry system will actuate the door presenter such that the vehicle operator can open the vehicle door. In one embodiment the predetermined distance may be 0-3 meters for example. The predetermined distance may vary due to the type of devices used for example, a Radio Frequency (RF) communication loop may have a greater range than a near-field communication loop.

However and if the vehicle operator is in close proximity to the vehicle for purposes of performing a task not associated with opening of the vehicle door (e.g., placing articles in the trunk, paying a parking meter or walking along a side of the vehicle, etc.) it desirable to not have the door presenter of the vehicle latch actuate even though the smart-key fob is in close proximity to the vehicle door latch. Also, while the vehicle operator carrying the smart-key fob is in close proximity of the vehicle, other persons approaching the vehicle should not automatically cause the door presenter to actuate (e.g. pedestrians passing along the vehicle on a pavement).

Accordingly, it is desirable to provide an improvement to actuators or presenters used with handleless doors.

BRIEF DESCRIPTION

Disclosed is a handleless door entry system for a vehicle. The system including: an occupant detection component including a first detection component and a second detection component, wherein the first detection component is configured to detect a device within a predetermined distance of the handleless door entry system, and wherein the second detection component is configured to detect an intent of an object or individual approaching the handleless door entry system.

In addition to one or more of the features described above, or as an alternative to any of the foregoing embodiments, the first detection component is a device capable of wireless communication with the device and the wireless communication is anyone of radio frequency (RF) communications, low frequency (LF) communications, bluetooth (BT) communications; UHF radio wave transmissions, near-field communication (NFC).

In addition to one or more of the features described above, or as an alternative to any of the foregoing embodiments, the secondary detection component includes a pair of video cameras.

In addition to one or more of the features described above, or as an alternative to any of the foregoing embodiments, the secondary detection component is a radar or a pulse microwave radar.

In addition to one or more of the features described above, or as an alternative to any of the foregoing embodiments, the handleless door entry system includes a vehicle latch operatively coupled to a door latch controller.

In addition to one or more of the features described above, or as an alternative to any of the foregoing embodiments, the vehicle latch is an electromechanical latch.

In addition to one or more of the features described above, or as an alternative to any of the foregoing embodiments, the handleless door entry system further comprises a door presenter, and a sensor operably coupled to the vehicle latch.

In addition to one or more of the features described above, or as an alternative to any of the foregoing embodiments, the device is a digital signature resident upon a mobile phone.

Also disclosed is a vehicle having the handleless door entry system as in any of the preceding claims wherein the vehicle further comprises a vehicle door and wherein an exterior surface of the vehicle door is handleless.

In addition to one or more of the features described above, or as an alternative to any of the foregoing embodiments, the secondary detection component is located on a central or B pillar of the vehicle.

In addition to one or more of the features described above, or as an alternative to any of the foregoing embodiments, the secondary detection component is configured to analyze moving and static objects in a hemispherical volume in close proximity to the vehicle and/or wherein the second detection component is operably coupled to a controller of a window regulator of the vehicle and wherein the second detection component will prevent operation of the window regulator if the second detection component detects an object or individual in close proximity to a closing window of the window regulator.

Also disclosed is a method of operating a handleless door entry system of a vehicle, the method including the following steps: detecting with a first detection component of an occupant detection component a device within a predetermined distance of the handleless door entry system; and determining with a second detection component an intent of an object or individual approaching the handleless door entry system, wherein the determining step is performed after the detecting step.

In addition to one or more of the features described above, or as an alternative to any of the foregoing embodiments, the determining step further includes determining a position of the individual's hand as they are approaching a vehicle door of the vehicle and/or wherein the determining step further comprises determining a speed and/or a direction and/or a distance/position of the object or individual approaching the vehicle door.

In addition to one or more of the features described above, or as an alternative to any of the foregoing embodiments, the handleless door entry system actuates a door presenter of the handleless door entry system upon identifying a movement of the individual's hand moving out of a detected shape of the object or individual shape, wherein the movement is towards a door gripping area of the vehicle door.

In addition to one or more of the features described above, or as an alternative to any of the foregoing embodiments, the first detection component is a device capable of wireless communication with the device and the wireless communication is anyone of radio frequency (RF) communications, low frequency (LF) communications, bluetooth (BT) communications; UHF radio wave transmissions, near-field communication (NFC) and wherein the secondary detection component comprises a pair of video cameras or is a radar.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
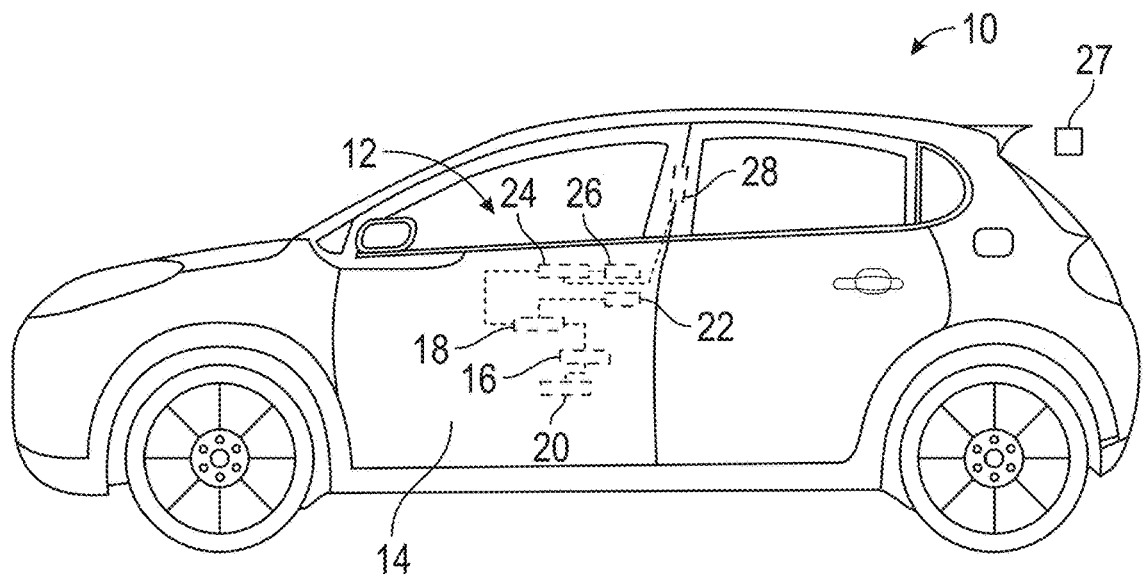
FIG. 1 is a side view of a vehicle with a handleless door system of the present disclosure.

In FIG. 1, a vehicle 10 with a handleless door entry system 12 is illustrated. In one embodiment, the handleless door entry system 12 is configured to open a vehicle door 14. The handleless door entry system 12 is located within the vehicle door 14 such that the external surface of the vehicle door can be manufactured without any handles on its exterior surface.

The vehicle door 14 is a handleless door and may be installed as a driver side door, passenger side door, or rear passenger doors. The vehicle door 14 may also be installed as a rear door of the vehicle, such as a liftgate, trunk or tailgate, for example. The handleless door entry system 12 is operatively coupled to the vehicle door 14 to hold the door (or liftgate, trunk, tailgate, etc.) in a closed position and to release the vehicle door to allow a user to move the vehicle door 14 to an open position.

In one embodiment, the handleless door entry system 12 includes a vehicle latch 16 operatively coupled to a door latch controller 18. In the illustrated embodiment, the door latch controller 18 comprises a microprocessor, microcontroller or other equivalent processing device capable of executing commands of computer readable data or program for executing a control algorithm that controls the operation of the door entry system 12. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, main energy supply interfaces as well as external or internal emergency energy supply via capacitors, batteries or a combination thereof and input/output signal interfaces, as well as combinations comprising at least one of the foregoing. For example, the controller may include input signal filtering to enable accurate sampling and conversion or acquisitions of such signals from communications interfaces.

In one embodiment, the vehicle latch 16 is an electromechanical latch and the handleless door entry system 12 further comprises a door presenter 20, a sensor 22 and an occupant detection component 24. The occupant detection component 24 further comprises or is operably coupled to a first detection component 26 that detects a device 27 that is capable of communicating with the handleless door entry system 12. In one non-limiting embodiment, the device 27 may be a smart-key fob of the handleless door entry system 12. In yet another embodiment, the device 27 may be any object capable of wireless communication with the handleless door entry system 12. In one non-limiting embodiment, the device 27 is a RF-receiver-emitter. In another or alternative embodiment, the device 27 may be a digital signature resident upon a mobile phone or any other equivalent device (e.g., smart watch, digital device, etc.). In one non-limiting embodiment, the first detection component 26 is a near-field communication (NFC) antenna or a radio frequency (RF) transmitter/receiver or any type of radio frequency transmitter/receiver or wireless transmitter/receiver configured to communicate with a transmitter/receiver of an authorized device 27 thereby providing a (RF) communication loop or otherwise between the device 27 and the first detection component 26 or other equivalent device. Non-limiting examples of types of such transmitters/receivers and device 27 include but are not limited to those capable of: radio frequency (RF) communications, low frequency (LF) communications, bluetooth (BT) communications; UHF radio wave transmissions, near-field communication (NFC), and equivalents thereof.

Upon detection of the device 27 within a predetermined range the handleless door entry system 12 will upon confirmation of the intent of the approaching individual or user actuate the door presenter 20 such that the vehicle operator can open the vehicle door. In one non-limiting embodiment, the predetermined range may be 0-3 meters. The predetermined range may vary due to the type of devices used for example, a Radio Frequency (RF) communication loop may have a greater range than a near-field communication loop. Of course, other ranges are intended to be within the scope of the present disclosure. In one embodiment and when the door presenter 20 is actuated, the vehicle door 14 is positioned slightly ajar from the vehicle body and thus a user or operator can grab a portion of the vehicle door 14. In one embodiment and when the vehicle door 14 is positioned slightly ajar from the vehicle body due to operation of the door presenter 20, the user when grasping the vehicle door 14 will contact sensor 22, which provides a signal to the door latch controller 18 so that the vehicle latch 16 can complete the opening of the vehicle door 14.

In one embodiment of the present disclosure, the occupant detection component 24 further comprises a secondary detection component 28, which in conjunction with the first detection component 26 will determine whether the holder of the device 27 is intending to open the vehicle door 14. For example, the secondary detection component 28 is a device that can detect an intent of an object or individual approaching the handleless door entry system 12.

In one embodiment, the secondary detection component 28 comprises a pair of video cameras or alternatively is a radar device, which in one non-limiting embodiment may be a pulse microwave radar (having in one non-limiting embodiment a typical frequency ranging from 60 to 100 GHz) placed in an area of the vehicle 10 that enables the secondary detection component 28 to watch or detect movement on a side of the vehicle. Of course, any type of radar device is contemplated to be used in accordance with various embodiments of the present disclosure. In one non-limiting embodiment, the secondary detection component 28 is located on a central or B pillar of the vehicle 10. Of course, other locations are contemplated.

Figure 2:
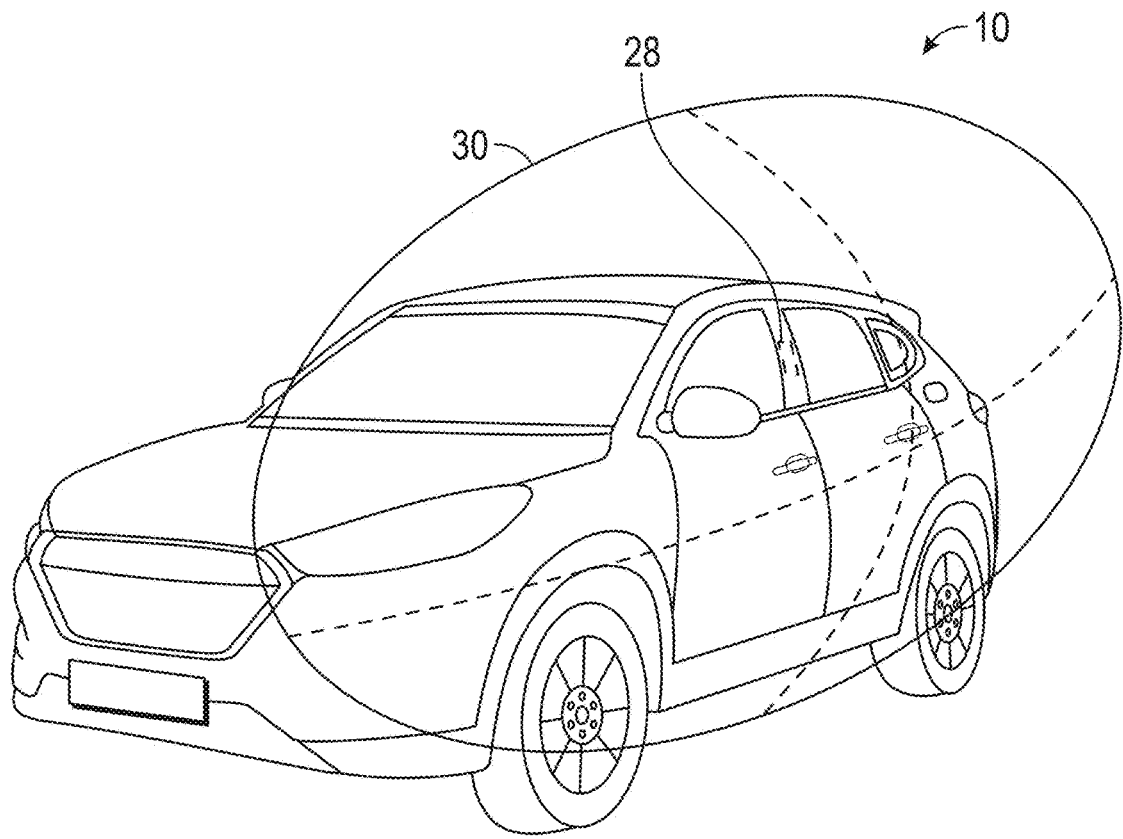
FIG. 2 is a perspective view of a vehicle with the handleless door system of the present disclosure.

By locating the secondary detection component 28 on a side of the vehicle 10, the secondary component 28 is able to analyze moving and static objects in a hemispherical volume 30 in close proximity to the vehicle 10. See for example, FIG. 2. Through the use of secondary detection component 28 objects approaching the vehicle have their position and size defined by a distance and angles with respect to the approaching object. For example, the sensing system senses the environment by building a 3D map which is a stack/concatenation of pyramids (radar)/cones (video pixels) defining the shape and distance of the object, which may be used for determine the intent of the approaching object. The accuracy of the secondary detection component 28 increases as the object is approaching the vehicle. The analysis of the movement, the size and the position of the approaching object(s) make it possible to know at least one of the following: 1) if the approaching object intends to open the door 14 of the vehicle 10; and 2) whether an obstacle may impede/limit the opening of the door 14.

As such and when a user or vehicle operator is approaching vehicle 10 and the device 27 is within the predetermined detection range, the handleless door entry system 12 via the first detection component 26 will detect the device 27 when it is within a predetermined range such as the range mentioned above. At this point and once the device 27 has been detected, the door locks of the handleless door entry system 12 will be unlocked via operation of a door latch controller 18 operatively coupled to the vehicle latch 16. Thereafter, the secondary detection component 28 will look for an intent of the individual approaching the side of the vehicle 10 by for example, the location of the individual's hands as they approach the vehicle 10 as well as the speed and direction at which they approach the vehicle 10. Once the secondary detection component 28 detects the requisite intent of the individual or user, the door presenter 20 is activated via operation of a door latch controller 18 operatively coupled to the door presenter 20 since the doors have been unlocked via detection of the device 27 by the first detection component 26. Alternatively, the door locks of the handleless door entry system 12 will be unlocked when the secondary detection component 28 detects the requisite intent of the individual or user prior activation of the door presenter 20.

Figure 3:
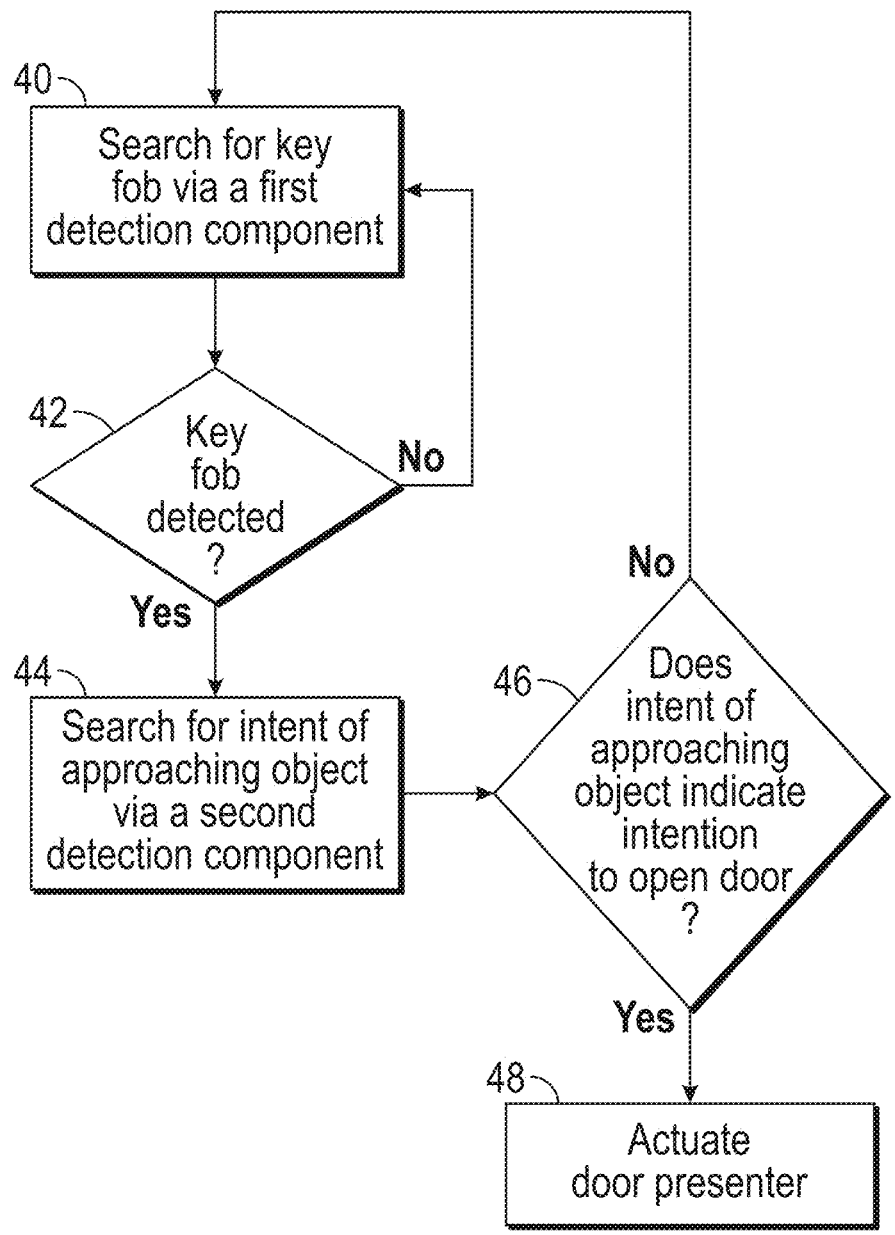
FIG. 3 is a flow chart illustrating a method of operating the handleless door system of the present disclosure.

Referring now to FIG. 3 and in order to determine whether the approaching object is intending to open the door 14, the following steps are performed by the handleless door entry system 12. At an initial step 40, the handleless door entry system 12 via the first detection component 26 searches for the device 27. As mentioned above and once the first detection component 26 has detected the device 27, when it is within a predetermined range such as the range mentioned above, the door locks will be unlocked. Upon detection of the device 27 at decision node 42 and the subsequent unlocking of the handleless door entry system 12, the handleless door entry system 12 then searches for the intent of the approaching object at step 44. If on the other hand, no device 27 is detected at node 42 the system continues to search for the key fob via the first detection component 26. At decision node 46, the handleless door entry system 12 via the second detection component 28 determines whether the intent of the detected object or user intends to open the vehicle door 14. If decision node 46 determines that the detected object or user intends to open the vehicle door 14, the handleless door entry system 12 will actuate the door presenter 20 at step 48 so that the vehicle door 14 is positioned slightly ajar from the vehicle body and thus a user or operator can grab a portion of the vehicle door 14 and contact sensor 22, which provides a signal to the door latch controller 18 so that the vehicle latch 16 can complete the release of the vehicle door 14.

If on the other hand, an intent to open the vehicle door 14 is not detected, the operation of the handleless door entry system 12 will return to step 40. At this point, if the handleless door entry system 12 has been unlocked, the door latch controller 18 of the handleless door entry system 12 will relock the handleless door entry system 12 since the user or individual has not shown the required intent (e.g., the user or operator walks away from the vehicle).

During operation of steps 44 and 46 of the handleless door entry system 12, the following: 1) speed and direction of the user or object compared to that of the vehicle door 14; 2) position of the object or user in distance and position vs the door grasping area; and 3) monitoring the area around the user or object to detect secondary shape modifications corresponding to movements of the user's or object's hand, for example, which is heading towards the door's gripping area where sensor 22 is located. In step 3, the second detection component 28 determines the position of an individual's or user's hand or detected object's hand with respect to their body and if the position of the hand indicates that the user or detected object is reaching towards the door's 14 gripping area. If so, the handleless door entry system 12 will actuate the door presenter 20 and thus the door 14 will be ready to be grasped by the user.

In an alternative embodiment, the handleless door entry system 12 may be used to watch for pinching risk upon closing of a window of the vehicle door. For example, the second detection component 28 is operably coupled to a controller of the window regulator wherein the second detection component 28 will prevent operation of the window regulator if an object is detected in close proximity to the closing window. For example and in one non-limiting embodiment, the second detection component 28 will prevent operation of an automatically operated window regulator (e.g., remote entry activated) if an object is detected in close proximity to the closing window.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A handleless door entry system for a vehicle, comprising:
   an occupant detection component including a first detection component and a second detection component, wherein the first detection component is configured to detect a device within a predetermined distance of the handleless door entry system, and wherein the second detection component is configured to detect an intent of an object or individual approaching the handleless door entry system, wherein the handleless door entry system includes:
   an electromechanical latch operatively coupled to a door latch controller;
   a door presenter;
   a sensor operably coupled to the electromechanical latch; and
   wherein the door presenter is actuated upon determination of a predetermined intent of the object or individual approaching the handleless door entry system by the second detection component and the handleless door entry system completes a release of a vehicle door by the electromechanical latch only after actuation of the sensor after the predetermined intent of the object or individual approaching the handleless door entry system is detected by the second detection component.

2. The handleless door entry system of claim 1, wherein the secondary detection component comprises a pair of video cameras.

3. The handleless door entry system of claim 1, wherein the secondary detection component is a radar or a pulse microwave radar.

4. The handleless door entry system of claim 1, wherein the device is a digital signature resident upon a mobile phone.

5. The handleless door entry system of claim 1, wherein the first detection component is capable of wireless communication with the device and the wireless communication is anyone of radio frequency (RF) communications, low frequency (LF) communications, bluetooth (BT) communications; UHF radio wave transmissions, near-field communication (NFC).

6. The handleless door entry system of claim 5, wherein the secondary detection component comprises a pair of video cameras.

7. The handleless door entry system of claim 5, wherein the secondary detection component is a radar or a pulse microwave radar.

8. A vehicle having the handleless door entry system as in claim 1, wherein an exterior surface of the vehicle door is handleless.

9. The vehicle as in claim 8, wherein the secondary detection component is located on a central or B pillar of the vehicle.

10. The vehicle as in claim 8, wherein the secondary detection component is configured to analyze moving and static objects in a hemispherical volume in close proximity to the vehicle and/or wherein the second detection component is operably coupled to a controller of a window regulator of the vehicle and wherein the second detection component will prevent operation of the window regulator if the second detection component detects an object or individual in close proximity to a closing window of the window regulator.

11. A method of operating a handleless door entry system of a vehicle, the method including the following steps:
   detecting with a first detection component of an occupant detection component a device within a predetermined distance of the handleless door entry system; and
   determining with a second detection component an intent of an object or individual approaching the handleless door entry system, wherein the determining step is performed after the detecting step, wherein the handleless door entry system includes:
   an electromechanical latch operatively coupled to a door latch controller;
   a door presenter;
   a sensor operably coupled to the electromechanical latch; and
   wherein the door presenter is actuated upon determination of a predetermined intent of the object or individual approaching the handleless door entry system by the second detection component and the handleless door entry system completes a release of a vehicle door by the electromechanical latch only after actuation of the sensor after the predetermined intent of the object or individual approaching the handleless door entry system is detected by the second detection component.

12. The method of claim 11, wherein the first detection component is capable of wireless communication with the device and the wireless communication is anyone of radio frequency (RF) communications, low frequency (LF) communications, bluetooth (BT) communications; UHF radio wave transmissions, near-field communication (NFC) and wherein the secondary detection component comprises a pair of video cameras or is a radar.

13. The method of claim 11, wherein the determining step further comprises determining a position of the individual's hand as they are approaching a the vehicle door of the vehicle and/or wherein the determining step further comprises determining a speed and/or a direction and/or a distance/position of the object or individual approaching the vehicle door.

14. The method of claim 13, wherein the handleless door entry system actuates the door presenter of the handleless door entry system upon identifying a movement of the individual's hand moving out of a detected shape of the object or individual shape, wherein the movement is towards a door gripping area of the vehicle door.

* * * * *